United States Patent [19]

Arendt et al.

[11] 4,234,558

[45] Nov. 18, 1980

[54] MOLTEN SALT SYNTHESIS OF ORTHORHOMBIC LEAD METANIOBATE POWDER

[75] Inventors: Ronald H. Arendt; Joseph H. Rosolowski, both of Schenectady, N.Y.

[73] Assignee: General Electric Company, Schenectady, N.Y.

[21] Appl. No.: 85,921

[22] Filed: Oct. 18, 1979

[51] Int. Cl.³ .............................................. C01G 33/00
[52] U.S. Cl. .................................. 423/593; 252/62.9; 423/DIG. 12
[58] Field of Search ....................... 423/593, DIG. 12; 252/62.9

[56] References Cited

U.S. PATENT DOCUMENTS

| | | | |
|---|---|---|---|
| 3,330,697 | 7/1967 | Pechini | 423/593 |
| 3,793,443 | 2/1974 | Arendt | 423/594 |
| 4,041,143 | 8/1977 | Fujiki et al. | 423/598 |

FOREIGN PATENT DOCUMENTS 49-60000  6/1974  Japan .................................. 252/62.9 R

OTHER PUBLICATIONS

Yamagida et al., "J. Ceramic Assoc., Japan," vol. 75, 1967, pp. 349–351.

Primary Examiner—Herbert T. Carter
Attorney, Agent, or Firm—Jane M. Binkowski; James C. Davis, Jr.; Leo I. MaLossi

[57] ABSTRACT

A mixture of lead oxide, niobium pentoxide and an alkali chloride salt solvent is heated to melt the chloride salt solvent in which the lead oxide and niobium pentoxide dissolve and react precipitating orthorhombic lead metaniobate.

4 Claims, No Drawings

MOLTEN SALT SYNTHESIS OF ORTHORHOMBIC LEAD METANIOBATE POWDER

The present invention relates to the preparation of small crystallite size, stoichiometric, orthorhombic lead metaniobate powder. This material is ferroelectric and is suitable for fabrication into piezoelectric ceramics. Such applications would rely heavily on controlled stoichiometry and phase purity.

Lead metaniobate powder in orthorhombic crystalline form is ferroelectric, but in rhombohedral form it has no ferroelectric properties. Conventionally, lead metaniobate powder is prepared by the high temperature solid state reaction of appropriate precursor compounds. The reaction product is largely of the rhombohedral crystalline form and does not contain a significant fraction of the orthorhombic form. Also, the reaction product is in the form of relatively large, strongly self-bonded particle aggregates which must be comminuted to the desired approximately 1.0 micron particle size before fabrication into ceramic articles.

Additional inadequacies of this conventional procedure are that the product, in commercial practice, is not fully reacted to yield uniform composition on a microscopic level. In cases where the physicochemical properties depend on the composition and its uniformity, the nonuniform composition of the convention product usually leads to less than optimum properties. Although procedures can be adopted in the conventional process to minimize these variations, the penalty in additional effort generally is considerable.

The comminution portion of the conventional process is also potentially detrimental in that significant, uncontrollable quantities of undesirable impurities can be introduced from the grinding media. Again, extraordinary precautions can be taken to minimize the comminution effects, but with attendant penalties.

The present process produces orthorhombic lead metaniobate powder. Also, the present invention circumvents the inadequacies of the conventional process by substituting for the solid state reaction, a liquid phase reaction scheme utilizing a molten salt solvent with subsequent precipitation of the product which does not require comminution. In the present process, the reactants, and/or their precursors, are slightly soluble in the molten salt solvent, therefore allowing literally atomic mixing in the liquid phase. The solubilities of the reactants are such that they exceed the corresponding solubility of the lead metaniobate in the molten salt solvent. Hence, the reaction product precipitates spontaneously from the molten salt solution. The reactants will continually dissolve to maintain a reactant-saturated solution until they are totally consumed by product formation.

Preferably, the reaction temperature in the present process is that required to attain reasonable reaction rates in the molten salt solvent, and it can be significantly lower than in the corresponding conventional solid state synthesis. Similarly, the reaction time can be as short as about 30 minutes or shorter compared with several hours for solid state reaction.

Briefly stated, the present process comprises providing particulate lead oxide in stoichiometric amount or particulate precursor therefor, providing particulate niobium pentoxide in stoichiometric amount or particulate precursor therefor, providing an alkali chloride salt selected from the group consisting of sodium chloride, potassium chloride and mixtures thereof, forming a mixture of said lead oxide or precursor therefor, said niobium pentoxide or precursor therefor and said chloride salt solvent, heating said mixture to a reaction temperature at least sufficient to melt said chloride salt but lower than the temperature at which lead metaniobate melts, said chloride salt in molten form being a solvent for said lead oxide and niobium pentoxide, each said precursor decomposing completely at or below said reaction temperature to form said oxide and by-product gas, maintaining said reaction temperature dissolving and reacting said lead oxide and said niobium pentoxide in said molten salt and precipitating the reaction product containing orthorhombic lead metaniobate, and recovering said precipitated reaction product.

The reaction for producing the present lead metaniobate is as follows:

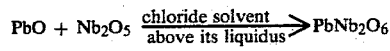

$$PbO + Nb_2O_5 \xrightarrow[\text{above its liquidus}]{\text{chloride solvent}} PbNb_2O_6$$

The PbO and $Nb_2O_5$ are used in stoichiometric amounts to achieve complete reaction.

The present process produces orthorhombic $PbNb_2O_6$ of stoichiometric composition. Since the crystals of $PbNb_2O_6$ are produced by precipitation from a saturated solution, they are chemically homogeneous, i.e. they are of uniform composition on a microscopic level. Specifically, the reaction product of the present invention is comprised of orthorhombic $PbNb_2O_6$ and $Pb_3Nb_4O_{13}$. The orthorhombic $PbNb_2O_6$ is always present in major amount, i.e. in excess of 50% by volume of the total volume of the reaction product, and usually, it is present in an amount of at least about 80% and higher by volume of the total volume of the reaction product. The reaction by which $Pb_3Nb_4O_{13}$ is formed is as follows:

$$3PbO + 2Nb_2O_5 \rightarrow Pb_3Nb_4O_{13}$$

The $Pb_3Nb_4O_{13}$ fraction is formed by compositional fluctuations in the reaction mixture, and the more uniform the reaction mixture, the less is the $Pb_3Nb_4O_{13}$ fraction. $Pb_3Nb_4O_{13}$ is a substantially inert material, and except for some dilution, it has no significant effect on the ferroelectric properties of the orthorhombic lead metaniobate. Also, since the individual crystals of the reaction product range up to about 1 micron in size and are generally submicron, they do not require any crushing or grinding operations with their attendant contamination with impurities from the equipment employed before they can be fabricated into useful ceramic articles.

In carrying out the present process, the reactants or precursors therefor can be of commercial or technical grade, and their particular purity depends largely on the particular application of the resulting reaction product powder. Specifically, the reactant oxides should not contain any impurities which would have a significantly deleterious effect on the resulting product.

The reactant oxides or precursors therefor should be of a size which allows the reaction to take place. Generally, these reactants or precursors therefor are used and are satisfactory in the particle size range in which they are available commercially, which ordinarily ranges from submicron up to about 100 microns. The reactant powders should also be free of large, hard aggregates, i.e. significantly above 100 microns in size, which might survive the mixing process and prevent sufficient reactant contact for satisfactory reaction rates.

In the present process the chloride salt is selected from the group consisting of sodium chloride, potassium chloride and mixtures thereof. The chloride salt solvent is used in a minimum amount of at least about 20% by weight of the total amount of reactant oxides and chloride salt solvent, and typically about 50% by weight. Amounts of chloride salt lower than about 20% by weight are not practical since the desired reaction will not proceed. There is no upper critical maximum amount of chloride salt, but amounts of chloride salt higher than about 80% by weight of the total amount of reactant oxides and chloride salt solvent provide no significant advantage. As the amount of chloride salt or salt mixture is increased from 20% by weight, to about 50% by weight, the amount of individual grains or crystals present in the resulting reaction product powder increases correspondingly, and with an amount of chloride salt or salt mixture above about 50% by weight, substantially all or all of the reaction product powder recovered consists essentially of individual grains or crystallites.

The reactants or precursors therefor and the alkali chloride salt solvent are admixed to produce a substantially thorough mixture to insure good contact and complete reaction. The actual mixing operation can be carried out in several ways which do not introduce undesirable impurities into the resulting product. Preferably, water at room or ambient temperature temperature is admixed with the reactant oxides or precursors therefor and the chloride salt solvent in an amount which, with stirring, is at least sufficient to form a slurry. The wet mixing can be carried out, for example, using a plastic milling medium or by wet mixing in a high speed blendor with preferably distilled or deionized water, depending on the application of the resulting product and preferably, with stainless steel or plastic stirrers, for example a propeller, in a stainless steel or plastic, preferably Teflon, lined vessel.

The particular reaction temperature used depends largely on the chloride salt used and the reaction rate desired, i.e. rate of precipitation of reaction product desired. Generally, the higher the reaction temperature, the faster is the reaction rate. In molten form, the present chloride salt is a solvent for the reactant oxides, and the minimum reaction temperature is the temperature at which the chloride salt or salt mixture melts and for sodium chloride alone the melting point of liquidus temperature is about 1073 K. (800° C.) whereas for potassium chloride alone it is about 1063 K. (790° C.). All mixtures of sodium chloride and potassium chloride form a mixture which melts at a temperature below the melting point of sodium chloride alone and thus, for the eutectic mixture of 50 mole % potassium chloride 50 mole % sodium chloride the minimum reaction temperature is 931 K. (658° C.). Preferably, in the present invention, the minimum reaction temperature is at least about 10K above the melting point, i.e. liquidus temperature of the chloride salt or salt mixture since such a temperature insures complete melting of chloride salt and also increases the fluidity of the molten salt producing increased wetting of the reaction mixture. However, the maximum reaction temperature is always below the melting point of lead metaniobate, which is approximately 1623 K. (1350° C.) and should be kept below the temperature at which the chloride salt vaporizes significantly. Particularly preferred is a reaction temperature ranging from about 1073 K. (800° C.) to about 1373 K. (1100° C.) since it is not difficult to maintain and provides high reaction rates without significant vaporization of the molten salt solvent.

At reaction temperature the chloride salt melts and the reactant oxides dissolve and react in the molten salt precipitating the present reaction product. The reaction temperature is maintained until the reaction is completed. The particular period of reaction time depends largely on reaction temperature as well as the amount of chloride salt used and is determinable empirically. When the reaction is completed, the reacted mass is cooled at any convenient rate, preferably in air and preferably to about room temperature.

The cooled reacted mass is a solid, fired cake comprised of particles of the present reaction product distributed throughout a matrix of solidified chloride salt. The cooled, solidified cake is disintegrated with water to yield crystallites of the present reaction product and an aqueous solution of the chloride salt. More specifically, water, preferably distilled or deionized to prevent introduction of impurities and preferably at room temperature, is added to the solid reacted mass in an amount at least sufficient to dissolve away the chloride salt content therefrom. The solubility of the present chloride salt is about 0.3 kilogram per liter of water at room temperature. This dissolution preferably is carried out in a plastic vessel, and as a practical matter with mixing to substantially shorten dissolution time, using, for example, a motor driven plastic or stainless steel stirrer. As the chloride salt dissolves, the solid mass disintegrates leaving a fine reaction product powder that contains no perceptibly agglomerated material, i.e. perceptible to the eye. The reaction product is then collected, washed and dried.

The reaction product powder can be recovered from the aqueous supernatant chloride solution by a number of techniques. For example, the reaction product powder can be recovered by decanting the supernatant solution and drying the reaction product in air. The particular recovery technique depends on the impurities which may be present and on the purity required in the ceramic fabricated from the powder. Preferably, the resulting slurry is mixed at room temperature in air for about 20 minutes. Mixing is then discontinued and a flocculating agent which is organic and soluble in water, preferably an anionic flocculant, is added in an amount which is sufficient to flocculate and settle the reaction product powder. After several washings and settlings, the wet powder is dried. Preferably, the flocculating agent is added in aqueous solution, about 0.1 gram of flocculant per 100 grams of water usually being satisfactory, and preferably the flocculating agent is used only in an amount necessary to settle the powder. For production of an orthorhombic $PbNb_2O_6$ powder of high purity, the flocculating agent should be completely removable by heating the powder in air at temperatures below the melting point of the powder and preferably not higher than about 1073 K. (800° C.). Preferably, to remove any remaining water and flocculant, it is heated at about 773 K. (500° C.) for about 20 minutes.

Alternatively, in the present process, if desired, a particulate inorganic precursor of the reactant oxides, i.e. PbO and $Nb_2O_5$, can be used. The precursor should decompose completely to form the oxide and by-product gas or gases leaving no contaminants in the reacted mass. Representatives of the precursors of the reactant oxides useful in the present process are the carbonates, hydroxides and nitrates. The precursor should be used in an amount sufficient to produce the respective oxide in stoichiometric amount.

The present reaction product powder is light yellow in color. The powder is free-flowing and can be in the form of aggregates or in the form of the individual powder crystals, but usually it is a mixture of both. The aggregates which range in size from about 1 micron to about 20 microns, are particles consisting essentially of a cluster of smaller sized crystals weakly bonded together autogeneously, i.e. such bonding is believed to be caused by Van der Waal's forces or by self-bonding, i.e. neck growth between grains. The individual crystals range up to about 1 micron in size and usually are submicron. The aggregates are friable and readily are broken down with very gentle comminution during subsequent pressing into a green body.

The present reaction product powder can be prepared free of impurities or free of significant impurities. Therefore, when the same procedure is used, its properties are reproducible from batch to batch.

The present reaction product powder is useful for producing ceramic bodies having application as piezoelectric devices.

A number of techniques can be used to fabricate the present reaction product powder into a useful ceramic body. Specifically, the reaction product powder can be pressed into a green body of desired size and shape and fired at a temperature below its melting point of about 1623 K. (1350° C.) to produce a fired body, i.e. polycrystalline ceramic body, having a density preferably of at least about 5.75 Mg/m$^3$ and useful, for example, as a piezoelectric transducer.

A number of techniques can be used to shape the powder into a green body, preferably using shaping tools and techniques that do not introduce impurities or any significant impurities into the powder. For example, the powder can be extruded, injection molded, die-pressed, isostatically pressed or slip cast to produce the green body of desired shape. Any lubricants, binders or similar materials used in shaping the powder should have no significant deteriorating effect on the properties desired in the ceramic fired therefrom. Such materials are preferably of the type which evaporate on heating at relatively low temperatures, preferably below 473 K. (200° C.), leaving no significant residue. The green body preferably has a density of at least about 50% of theoretical density to promote densification during firing.

Firing of the green body is carried out at atmospheric pressure at a temperature preferably ranging from about 1373 K. (1100° C.) to below about 1623 K. (1350° C.) in air or in an oxygen-enriched sintering atmosphere, and preferably in oxygen.

The invention is further illustrated by the following examples wherein the procedure was as follows unless otherwise stated:

The PbO and Nb$_2$O$_5$ were reagent grade and ranged in size up to about 100 microns.

The water used was distilled water.

EXAMPLE 1

456.42 grams of PbO, 546.31 grams of Nb$_2$O$_5$, 454 grams of NaCl and 454 grams of KCl were stirred vigorously with about 1500 ml of distilled water forming a slurry which was then dried in an air oven at ~200° C. to remove the water.

The dried mixture was placed in a platinum vessel and covered loosely with a platinum cover to prevent introduction of impurities and placed in an air furnace pre-heated to the reaction temperature of 1273 K. (1000° C.). After about 60 minutes at 1273 K. (1000° C.), the vessel was removed from the furnace and allowed to cool to room temperature.

The reaction product was brick-like in texture and hardness. It was placed in about 4.2 liters of distilled water in a plastic vessel provided with a motor driven plastic coated stainless steel stirrer. After ~10 minutes of stirring, the brick-like cake product disintegrated completely producing a slurry of a fine powder that contained no visually perceptible aggregated material.

An aqueous flocculating solution comprised of 0.02 gram of anionic flocculant (a polyamide imide powder sold under the trademark Hercofloc 821) in 20 grams of distilled water was then added to the stirred slurry. The powder was allowed to settle and the supernatant was then decanted.

The resulting reaction product powder was then washed with distilled water, flocculated with the aqueous flocculating solution and the supernatant decanted, and this step was done ten times. The resulting wet powder was dried by heating in air at 423 K. (150° C.). The dried reaction product powder was then heated in air at about 773 K. (500° C.) for about 3 hours to remove any remaining water and flocculant.

About 1000 grams of reaction product powder were recovered. The powder was yellow in color, free-flowing and did not have any perceptible aggregates, i.e. perceptible to the eye.

X-ray diffraction analysis of a portion of the powder showed that it was comprised of orthorhombic PbNb$_2$O$_6$ with a minor amount (estimated <20% by volume) of cubic Pb$_3$Nb$_4$O$_{13}$. No rhombohedral PbNb$_2$O$_6$ was detected.

EXAMPLE 2

The PbNb$_2$O$_6$ powder prepared in Example 1 was used in this example. About 4 grams of the PbNb$_2$O$_6$ powder was pressed in a one inch diameter Carboloy lined steel die at 10,000 psi. The resulting pellet was embedded in PbNb$_2$O$_6$ powder in a crucible of stabilized zirconia which was covered with a platinum cover. The pellet was then sintered in an atmosphere of oxygen at 1200° C. for two hours. The resulting sintered polycrystalline pellet of PbNb$_2$O$_6$ had a density of 5.85 g/cc which was about 87.6% of theoretical density.

Two silver electrodes were fired onto the sintered pellet, and the pellet was poled by applying a field of 130 volts per mil at 145° C. for a period of one hour. This resulted in the sintered pellet developing a piezoelectric strain coefficient, $d_{33}$, of $109 \times 10^{-12}$ coulombs per newton and a planar coupling coefficient of 0.212, both properties being measured one day after poling. After poling, the loss tangent was 0.009 and the relative dielectric constant was 650.

These properties characterize the usefulness of the material of this sintered pellet for applications for making piezoelectric transducers.

The following copending U.S. patent applications are assigned to the assignee hereof and are incorporated herein by reference:

Ser. No. 8734 filed Feb. 2, 1979 in the names of R. H. Arendt and M. J. Curran entitled "Molten Salt Synthesis of Lithium Meta-Aluminate Powder" discloses a process consisting essentially of forming a mixture of an alkali chloride solvent salt, a lithium salt reactant selected from the group consisting of lithium hydroxide, lithium nitrate, lithium carbonate and mixtures thereof, and an aluminum salt reactant selected from the group consisting of aluminum hydroxide, alpha-alumina, gamma alumina and mixtures thereof and heating said mixture to melt the chloride salt solvent in which the lithium and aluminum salt reactants dissolve and react precipitating lithium meta-aluminate.

Ser. No. 10,747 filed Feb. 9, 1979 in the names of R. H. Arendt and M. J. Curran entitled "Magnesium Aluminum Spinel" discloses a process consisting essentially of forming a mixture of magnesium oxide, aluminum oxide and an alkali chloride salt solvent and heating said mixture to melt the chloride salt solvent in which the magnesium oxide and aluminum oxide dissolve and react precipitating magnesium aluminate.

Ser. No. 11,100 filed Feb. 12, 1979 in the names of R. H. Arendt and M. J. Curran entitled "Magnesium Chrome Spinel" discloses a process which consists essentially of forming a mixture of magnesium oxide, chromium oxide and an alkali chloride salt solvent and heating said mixture to melt the chloride salt solvent in which the magnesium oxide and chromium oxide dissolve and react precipitating magnesium chromite.

Ser. No. 85,911 filed of even data herewith in the names of R. H. Arendt and J. H. Rosolowski entitled "Molten Salt Synthesis of Alkali Niobate Powders", discloses a process consisting essentially of forming a mixture of niobium pentoxide, an oxide of an alkali selected from the group consisting of sodium, potassium, lithium and mixtures thereof, and an alkali chloride salt solvent, and heating said mixture to melt the chloride salt solvent in which the niobium oxide and alkali oxide dissolve and react precipitating the alkali niobate.

Ser. No. 85,912 filed of even date herewith in the names of R. H. Arendt and J. H. Rosolowski entitled "Molten Salt Synthesis of Modified Alkali Niobate Powders" discloses a process consisting essentially of forming a mixture of niobium pentoxide, an oxide of sodium, potassium, or mixtures thereof, an oxide of lead, cadmium, or mixtures thereof, and an alkali chloride salt solvent, and heating said mixture to melt the chloride salt solvent in which all of the oxides dissolve and react precipitating modified alkali niobate.

Ser. No. 85,924 filed of even date herewith in the name of R. H. Arendt entitled "Molten Salt Synthesis of Barium And/Or Strontium Titanate Powder" discloses a process consisting essentially of forming a particulate mixture of an alkali chloride solvent salt, titanium oxide and an alkaline earth reactant selected from the group consisting of barium oxide, strontium oxide, and mixtures thereof, and heating the mixture to melt the chloride salt solvent in which the titanium oxide and alkaline earth reactant dissolve and react precipitating a titanite selected from the group consisting of barium titanate, strontium titanate and mixtures thereof.

What is claimed is:

1. A process for producing a reaction product powder containing orthorhombic lead metaniobate in excess of 50% by volume of said reaction product, which consists essentially of providing particulate PbO in stoichiometric amount or particulate precursor therefor, providing particulate $Nb_2O_5$ in stoichiometric amount or particulate precursor therefor, providing an alkali chloride salt selected from the group consisting of sodium chloride, potassium chloride and mixtures thereof, forming a mixture of said PbO or precursor therefor, said $Nb_2O_5$ or precursor therefor and said chloride salt solvent, said chloride salt being used in an amount of at least about 20% by weight of the total amount of said PbO and $Nb_2O_5$ and said chloride salt, heating said mixture to a reaction temperature at least sufficient to melt said chloride salt, each said precursor decomposing completely at or below said reaction temperature to form said oxide and byproduct gas, said chloride salt in molten form being a solvent for said PbO and $Nb_2O_5$, maintaining said reaction temperature dissolving and reacting said PbO and $Nb_2O_5$ in said molten salt and precipitating said reaction product powder, and recovering said precipitated reaction product powder by dissolving said chloride salt and separating said precipitated reaction product powder from the resulting salt solution.

2. The process according to claim 1 wherein said PbO and $Nb_2O_5$ or precursors therefor range in particulate size from submicron up to about 100 microns.

3. The process according to claim 1 wherein said chloride salt is a mixture comprised of 50 mole % sodium chloride and 50 mole % potassium chloride and said reaction temperature is a minimum of about 658° C.

4. The process according to claim 1 wherein said reaction product is comprised of orthorhombic lead metaniobate and $Pb_3Nb_4O_{13}$, said $Pb_3Nb_4O_{13}$ being less than 20% by volume of the total volume of said reaction product.

* * * * *